United States Patent
Nayak et al.

(10) Patent No.: US 7,420,781 B2
(45) Date of Patent: Sep. 2, 2008

(54) HEAD ACTUATOR ASSEMBLY FOR A TAPE DRIVE

(75) Inventors: Ashok B. Nayak, Glendora, CA (US); James M. Decot, Fountain Valley, CA (US)

(73) Assignee: Certance LLC, San Jose, CA (US)

( * ) Notice: Subject to any disclaimer, the term of this patent is extended or adjusted under 35 U.S.C. 154(b) by 0 days.

(21) Appl. No.: 11/755,406

(22) Filed: May 30, 2007

(65) Prior Publication Data

US 2008/0024932 A1 Jan. 31, 2008

Related U.S. Application Data

(63) Continuation of application No. 10/765,184, filed on Jan. 28, 2004, now Pat. No. 7,227,724.

(60) Provisional application No. 60/444,115, filed on Jan. 30, 2003.

(51) Int. Cl.
*G11B 5/55* (2006.01)

(52) U.S. Cl. .................. 360/261.1; 360/291; 360/261.3

(58) Field of Classification Search .............. 360/261.1, 360/261.3, 291
See application file for complete search history.

(56) References Cited

U.S. PATENT DOCUMENTS

| | | | | |
|---|---|---|---|---|
| 5,371,636 A | * | 12/1994 | Nayak et al. | 360/75 |
| 5,450,257 A | * | 9/1995 | Tran et al. | 360/76 |
| 5,566,039 A | * | 10/1996 | Spicer | 360/261.1 |
| 5,862,014 A | * | 1/1999 | Nute | 360/291 |
| 6,229,674 B1 | * | 5/2001 | Todd | 360/261.1 |
| 6,388,836 B2 | * | 5/2002 | Anderson et al. | 360/128 |
| 6,404,598 B1 | * | 6/2002 | Nayak et al. | 360/291 |
| 6,697,230 B1 | * | 2/2004 | Nayak | 360/267.4 |
| 7,227,724 B2 | * | 6/2007 | Nayak et al. | 360/261.1 |
| 2001/0046106 A1 | * | 11/2001 | Todd | 360/261.1 |
| 2002/0041470 A1 | * | 4/2002 | Nayak et al. | 360/261.1 |

FOREIGN PATENT DOCUMENTS

JP 05210830 A * 8/1993

\* cited by examiner

*Primary Examiner*—William J Klimowicz
(74) *Attorney, Agent, or Firm*—Baker Botts L.L.P.

(57) ABSTRACT

A head actuator assembly includes a coarse positioner base assembly that is mounted on a guide shaft and an anti-rotation shaft and provides increased structural rigidity due to a four-point support and spring loading of the coarse positioner base against the anti-rotation shaft. A two-part head-carriage and voice coil holder system permits different materials to be used for the head-carriage and the voice coil holder, obviating structural problems of a single-structured head-carriage and coil-holder system. A flexible printed circuit bracket eases manufacture and allows flexible printed circuits to be slid into the bracket and retained in place without the need for locating tabs and screws.

9 Claims, 12 Drawing Sheets

HEAD ACTUATOR ASSEMBLY FOR A TAPE DRIVE

RELATED APPLICATIONS

The present continuation application claims priority U.S. patent application Ser. No. 10/765,184, now U.S. Pat. No. 7,227,724, filed on Jan. 28, 2004 which in turn claims priority to U.S. provisional application No. 60/444,115, filed on Jan. 30, 2003, and the entire contents of both are hereby incorporated herein by reference.

FIELD OF THE INVENTION

The present invention relates to the field of tape drives, and more particularly, to the head actuator assembly for a tape drive.

BACKGROUND OF THE INVENTION

A tape drive head assembly generally comprises three main components: a magnetic read/write head, a movable carriage supporting the head, and a flexible circuit electrically connected to the head. The flexible circuit includes a fine positioner loop and a coarse positioner loop. A flexible printed circuit provides communication between the main control circuitry of the tape drive and the head positioning apparatus. Generally, a voice coil serves as an actuator for the fine positioner.

Magnetic tape data storage devices, or tape drives, are used for storing large quantities of computer data. As storage capacities of tape drives increase, the overall performance and structural integrity of the drives needs to improve. One of the areas needing improvement is found in the performance of the head positioning system.

Lateral motion at the read/write head needs to be controlled within a few micrometers in order to achieve a LTO (linear tape open) cartridge capacity of 400 GB, for example. Conventional techniques of controlling this lateral motion include a camming arrangement between a pivoting beam structure and the head structure that translates a rotational motion into a linear motion of the head traverse. The fine positioner prime mover is a rotary voice coil actuator. One of the major concerns with such an arrangement is the friction associated with both the pivot and cam follower systems. Unlike hard disk drives, a tape drive is an open system and subject to contamination. This makes pivot and cam-follower guide friction problems even worse. Further, there is a potential loss of accuracy during a rotary to linear motion conversion due to clearance in the cam-follower system, as well as wear in the pivot system. Thus, problems in servoing due to friction and the rotary to linear approach makes the requirement of controlling the lateral motion within two micrometers, for example, difficult to achieve.

Another concern of conventional head positioning systems is the lack of adequate structural rigidity in the coarse positioner construction to achieve a necessary frequency response requirement to perform adequate servoing. Conventional systems employ a single guide shaft, resulting in a cantilever beam with a low first mode of resonance. Due to this low first mode of resonance, it is difficult to maintain the required servo-bandwidth to satisfy the necessary accuracy requirement of high capacity tape drives.

Additional concerns with conventional coarse positioner constructions, which are required to hold the head carriage assembly and the voice coil system, include the inability to avoid structural problems of the voice coil holder structure, exacerbating resonance-related problems.

A still further problem with conventional coarse positioner constructions is the integral nature of such systems. The magnetic head is a high cost element, while the voice coil system is a much lower cost element. However, in an integral system, if a voice coil element is defective, the entire coarse positioner system, including the relatively expensive head, needs to be replaced.

Another concern with conventional systems is the use of a flexible printed circuit (FPC) routing system that requires locating tabs and corresponding screws for attachment of the locating tabs. The resulting design presents manufacturing assembly issues and increased cost of parts. Further, the tab system provides for an FPC registration on a single edge. This requires additional assembly instructions for the proper routing of the FPC.

SUMMARY OF THE INVENTION

There is a need for a head actuator assembly for a tape drive with an improved fine positioner system and coarse positioner base mounting that increases the accuracy of the fine positioning as well as improves the structural rigidity of the coarse positioner. Further, there is a need for a head actuator assembly that allows for more efficient assembly, especially with respect to the flexible printed circuit routing.

These and other needs are met by embodiments of the present invention which provide a head actuator assembly for a tape drive comprising a coarse positioner base assembly and first and second shafts that are vertically mounted at first ends on the coarse positioner base assembly. A coarse positioner base is provided that is configured to carry a head carriage assembly and voice coil holder. The coarse positioner base has at least first and second bores and at least first and second bushings respectively in the first and second bores. The coarse positioner base is vertically mounted on the first and second shafts so that the first and second shafts respectively extend through the first and second bushings and the first and second bores.

By providing a two-shaft system, with one of the shafts being a guide shaft, for example, and the other shaft being an anti-rotation shaft, for example, the coarse positioner base can be supported at both of the shafts. This results in an improved structural construction compared to a cantilever system, thereby providing a much stiffer system as compared to a single shaft-guide system.

The earlier stated needs are also met by embodiments of the present invention which provide a head actuator assembly for a tape drive comprising a head carriage assembly and a voice coil holder removably coupled to the head carriage assembly. By employing a separated head carriage assembly and voice coil holder, different materials may be employed for these elements, resulting in improved rigidity and structural stability. Further, this system allows replacement of a defective voice coil after assembly, since the entire head does not have to be discarded. This saves costs during manufacture.

In certain embodiments, the fine positioner system includes a linear voice coil motor and uses flexures to improve the fine positioning without a rotary to linear motion conversion, such as that employed in conventional devices.

In certain embodiments of the invention, a flexible printed circuit bracket is provided that contains slots through which an FPC is routed and retained. This avoids the use of locating tabs and corresponding screws for attachment. Hence, no additional hardware is needed to secure the flexible printed circuit in place, easing assembly and reducing material costs as well as improving registration.

The earlier stated needs are met by other embodiments of the present invention which provide an assembly for a tape drive comprising a magnetic read/write head and means for positioning the head.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to performance and structural integrity in magnetic tape data storage devices. These problems include friction and vibration concerns associated with conventional pivot and cam following systems, and inadequate structural rigidity to produce a frequency response required to perform adequate servo functions, as well as inefficient assembly concerns related to flexible printed circuit routing. The present invention solves these problems, in part, by providing a head actuator assembly for a tape drive that employs a linear voice coil motor and use of flexures, thereby avoiding a pivot and cam-follower arrangement. Since a tape drive is an open system and subject to contamination, the arrangement of the invention avoids the additional problems an open system experiences due to contamination. Embodiments of the invention employ a coarse positioner base mounting system that uses two shafts with a force bias applied at one shaft to create a much stiffer system as compared to single shaft-guide systems. Further, embodiments of the invention provide for a separate head-carriage and voice coil holder system that allows different materials to be employed instead of a single-structured integral head-carriage and voice coil-holder system. The separation of the head and voice coil allows an inexpensive voice coil to be simply replaced if defective during assembly, and prevents the waste of an expensive magnetic head that is not defective. In addition, separation of the voice coil holder and head-carriage assembly allows the use of an alternate stiffer material of the voice coil holder.

Figure 1:
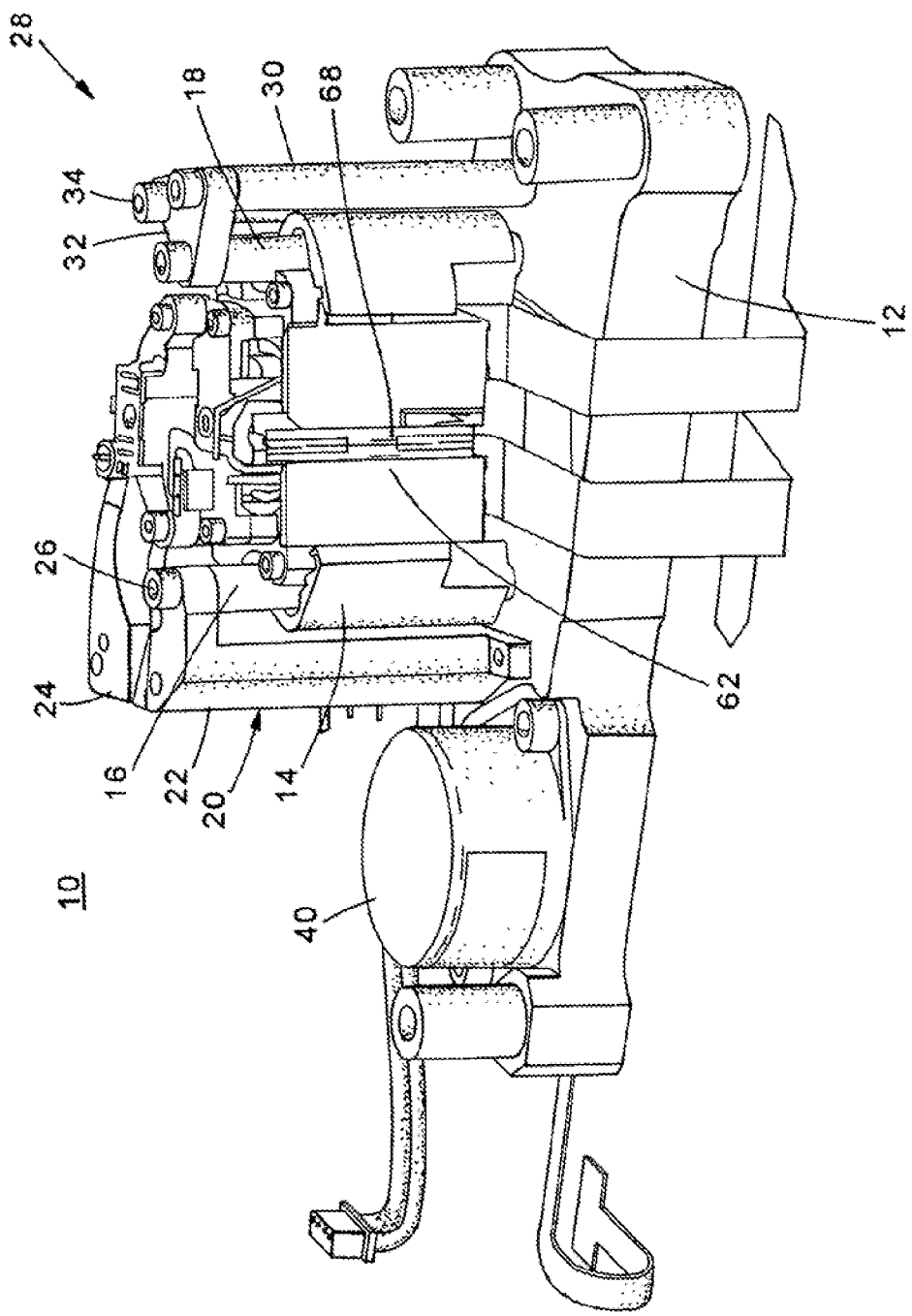
FIG. 1 is a perspective front view of a head positioner assembly constructed in accordance with embodiments of the present invention.
Figure 2:
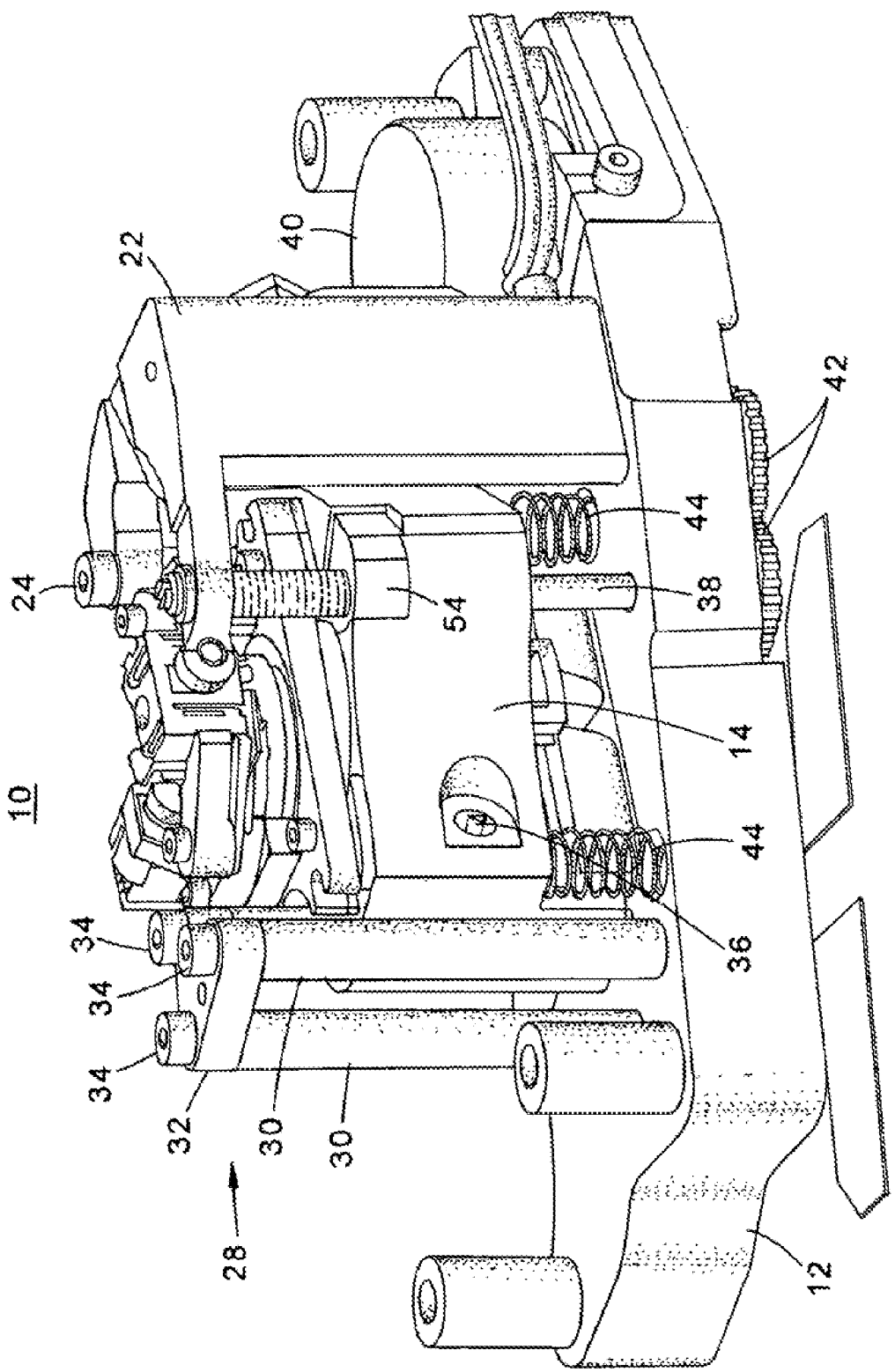
FIG. 2 is a back perspective view of the head positioner assembly of FIG. 1.

FIGS. 1 and 2 are front and back perspective views of a head positioner assembly constructed in accordance with embodiments of the present invention. The head positioner assembly 10 includes a coarse positioner base assembly 12 on which many of the components of the head positioner assembly 10 are mounted.

A coarse positioner base 14 is slidably mounted on first and second shafts 16, 18. The first shaft is a guide shaft 16, affixed to the coarse positioner base assembly 12, and the second shaft is an anti-rotation shaft 18, also affixed to the coarse positioner base assembly 12. This two shaft system prevents a low first mode of resonance, as normally occurs in a single shaft system having a cantilever beam with a low first mode of resonance. Because of the structural rigidity provided by the combination of the coarse positioner base 14 and guide shaft 16, and anti-rotation shaft 18, a required servo-bandwidth is achieved to meet the necessary accuracy requirement of high capacity tape drives.

At the top, the guide shaft 16 is supported by a guide shaft support arrangement 20 which comprises a brace 22 that is vertically mounted to the coarse positioner base assembly 12. A horizontally extending plate 24 is provided at the top of the brace 22 and includes a bore through which a fastener 26 secures the guide shaft 16. This guide shaft support arrangement 20 provides a very stable securement of the guide shaft 16.

The anti-rotation shaft 18 is similarly supported by an anti-rotation shaft support arrangement 28 that includes two support shafts 30 that are securely mounted on the coarse positioner base assembly 12. A horizontal connecting plate 32 connects the top of the support shafts 30 and the anti-rotation shaft 18. Fasteners 34 secure the anti-rotation shaft 18 and the support shafts 30 to the connecting plate 32. The anti-rotation shaft support arrangement 28 provides a very secure and rigid structure for the anti-rotation shaft 18.

In certain embodiments of the invention, the anti-rotation shaft 18 has a smaller diameter than the guide shaft 16 to allow for manufacturing tolerances. The coarse positioner base 14 is spring loaded by a biasing element, such as a spring plunger 36 (depicted in FIG. 2) against the anti-rotation shaft 18. This ensures that the coarse position base 14 is always supported at the anti-rotation shaft 18, which in turn, provides further structural rigidity to the coarse positioner assembly.

Figure 3:
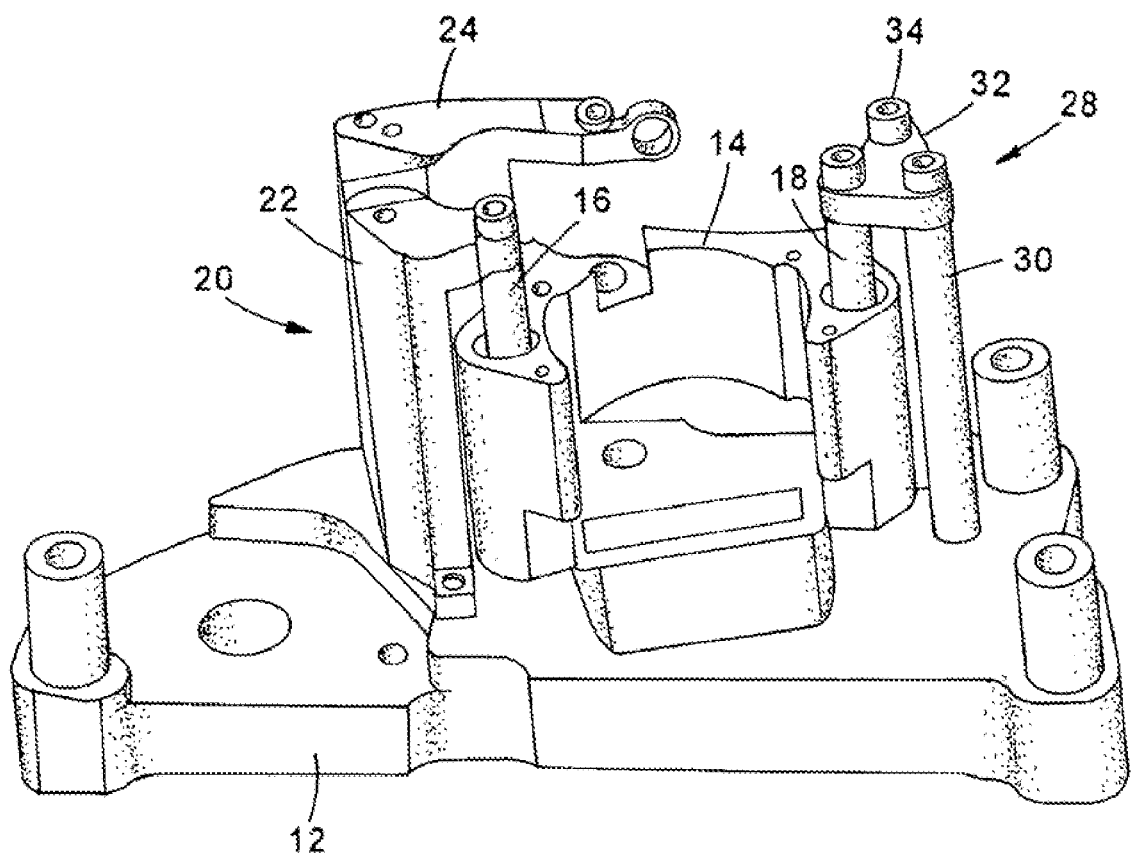
FIG. 3 is a front perspective view of the head positioner main bracket constructed in accordance with embodiments of the present invention depicted in isolation.
Figure 4A:
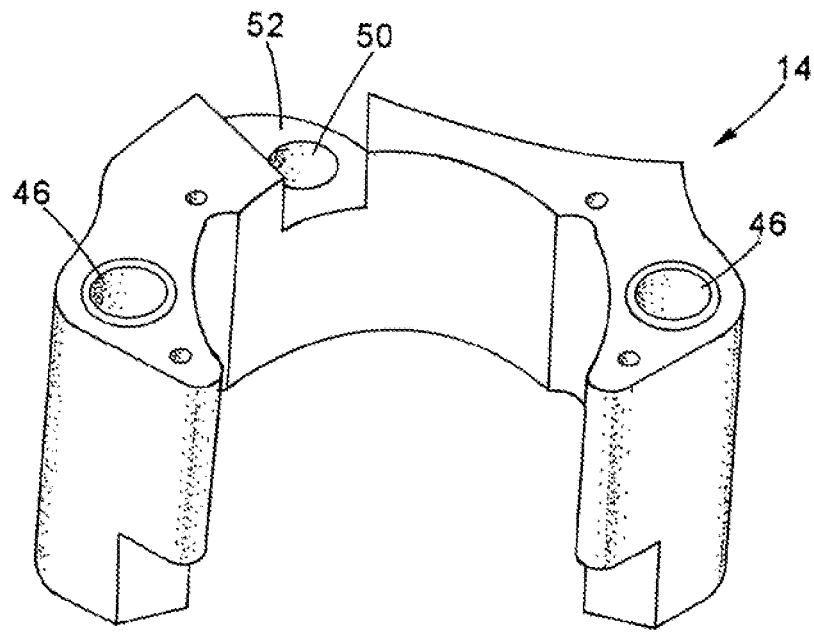
FIG. 4a is a top perspective view of the coarse positioner base in accordance with embodiments of the present invention.
Figure 4B:
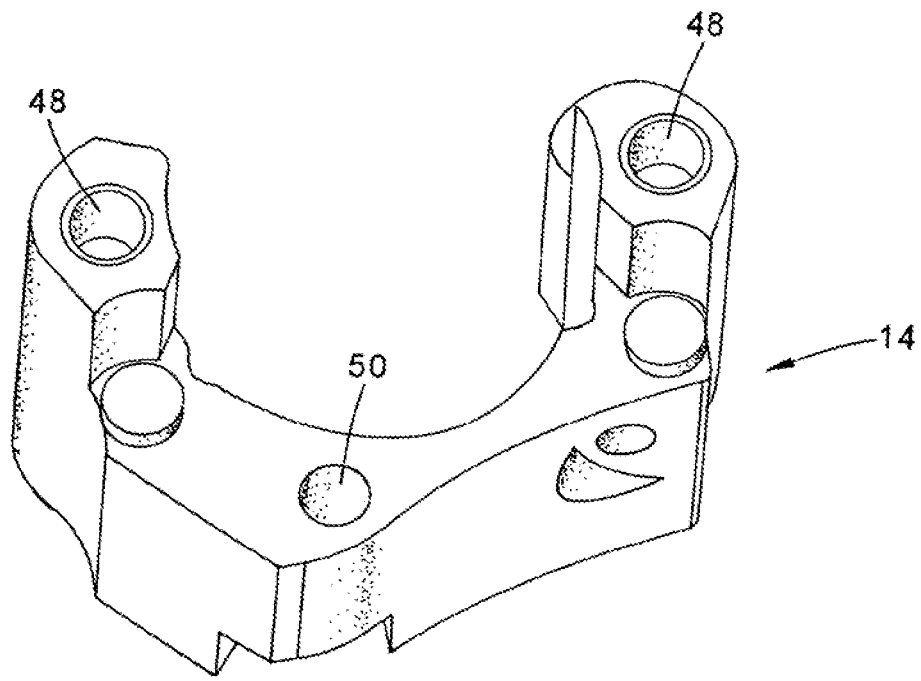
FIG. 4b is a bottom perspective view of the coarse positioner base constructed in accordance with embodiments of the present invention.

The coarse positioner base 14 is moved vertically through a lead screw 38 that extends through the coarse positioner base 14. The lead screw 38 is driven by a motor 40 through a gear train 42 (only depicted in FIG. 2). Springs 44 bias the coarse positioner base 14 against the lead screw nut 54. The coarse positioner base assembly 12, the guide shaft support arrangement 20, the anti-rotation shaft 18 and the coarse positioner base 14 are depicted in isolation in FIG. 3. Also, FIGS. 4a and 4b show top and bottom perspective views, respectively, of the coarse positioner base 14.

The coarse positioner base 14 includes top bushings 46 and bottom bushings 48 through which the guide shaft 16 and the anti-rotation shaft 18 extend. The top and bottom bushings 46, 48 provide a four-point support for the coarse positioner base 14, resulting in increased structural rigidity in comparison to conventional designs. As best illustrated in FIGS. 4a-4b, the coarse positioner base 12 includes a lead screw bore 50. A notch 52 is provided for the lead screw nut 54 (FIG. 2).

Figure 5:
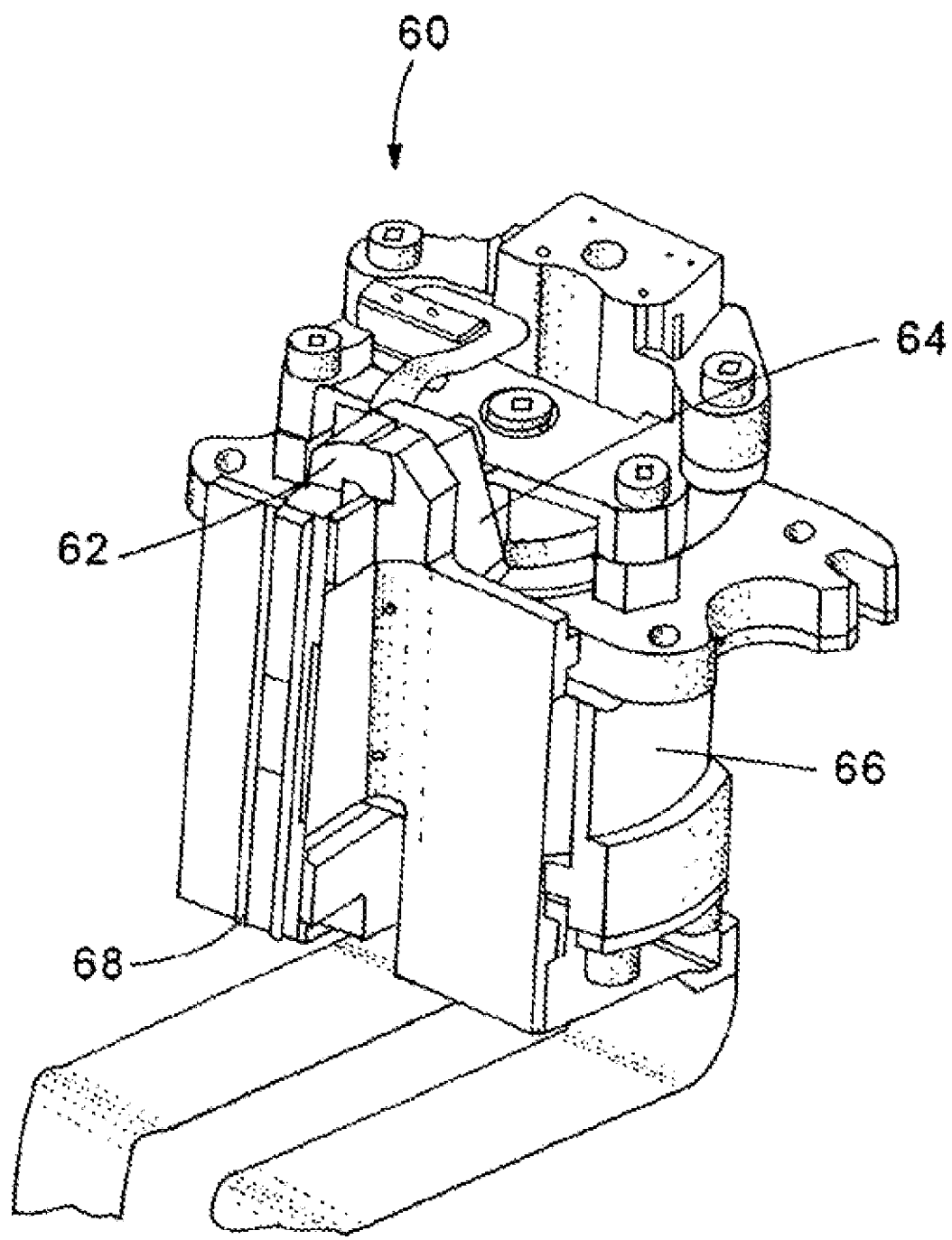
FIG. 5 is a front perspective view of a fine positioner assembly constructed in accordance with embodiments of the present invention.
Figure 6:
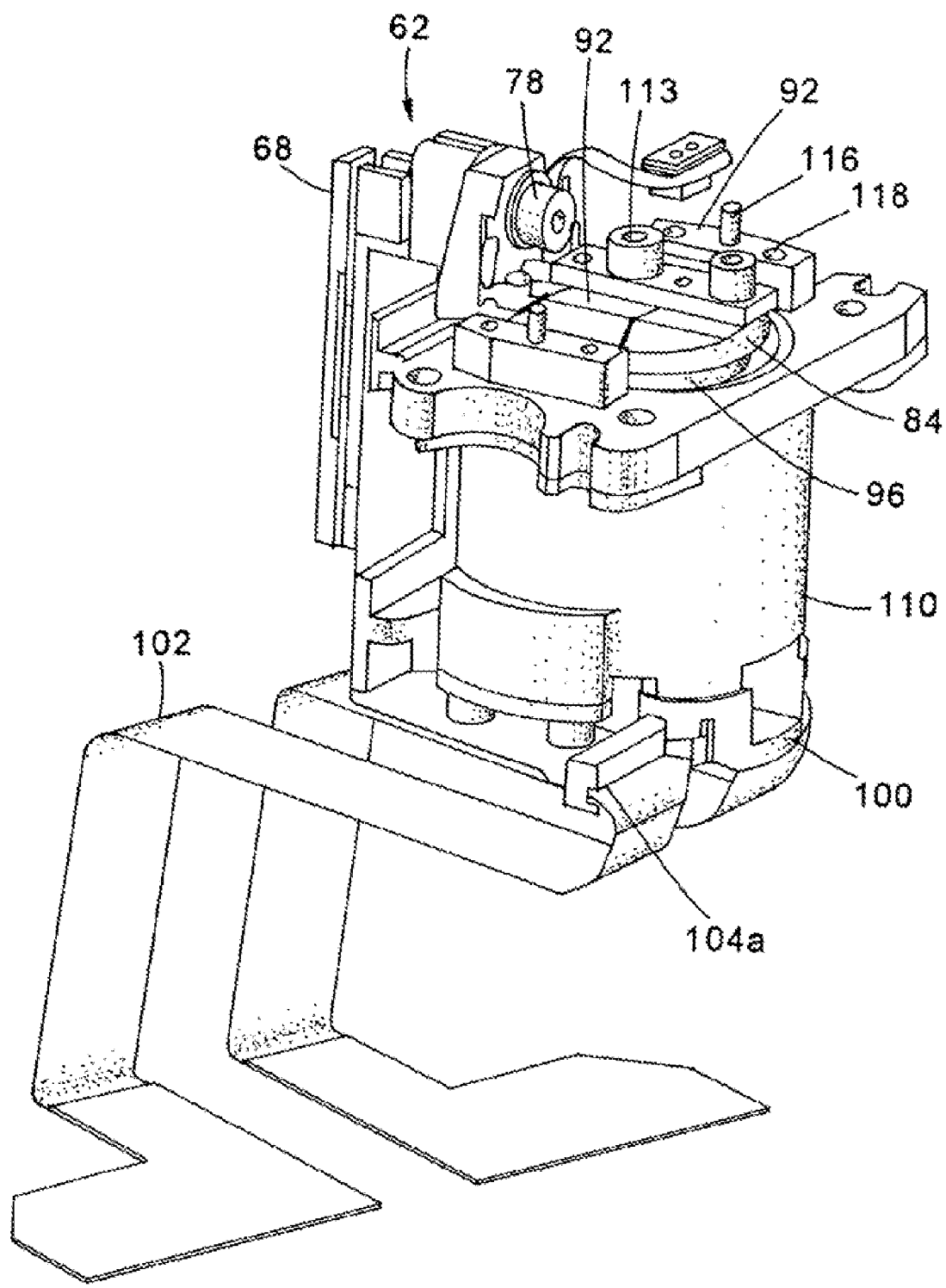
FIG. 6 is a back perspective view of the fine positioner assembly constructed in accordance with embodiments of the present invention.

A fine positioner assembly is depicted in isolation in FIGS. 5 and 6, and is depicted assembled within the head positioner assembly 10 in FIG. 1. The fine positioner assembly 60 includes a head carriage assembly 62, a voice coil holder assembly 64 and a voice coil motor holder assembly 66. As will be appreciated from the following description, these assemblies 62-66 are separable, thereby providing significant advantages over conventional designs, including performance and cost advantages. The fine positioner assembly 60 is carried by the coarse positioner base 14 that provides a coarse positioning of the magnetic head. The fine positioner system of the invention uses a linear voice coil motor and flexures to provide for fine positioning of the head.

Figure 7:
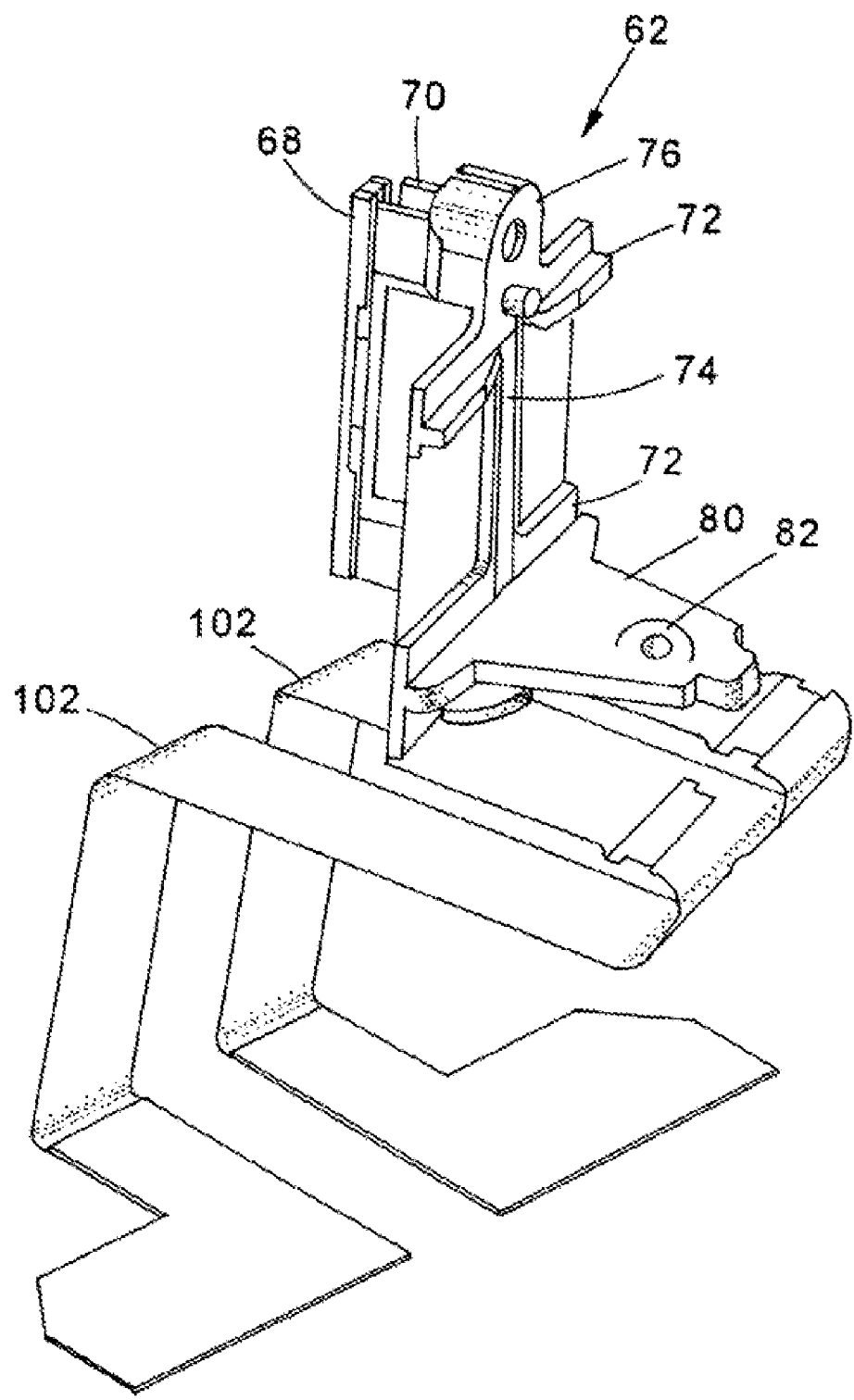
FIG. 7 is a back perspective view of a head carriage assembly in isolation constructed in accordance with embodiments of the present invention.

The head carriage assembly 62 carries a magnetic read/write head 68. The head carriage assembly 62 is depicted in isolation in a back perspective view of FIG. 7. For weight purposes, the head carriage assembly 62 may be made substantially out of a lighter weight material, such as plastic with some conductive filler such as carbon to provide an anti-static property to the head-carriage assembly. A magnetic read/write head holder 70 is supported by horizontal support elements 72 that are connected together by a vertical support bar 74. A screw hole 76 receives a fastening screw 78 that connects the voice coil holder assembly 64 to the head carriage assembly 62 at a top portion thereof. A horizontal support member 80 extends from the lower horizontal support element 72. The horizontal support member 80 includes a screw hole 82 through which the voice coil holder assembly 64 is secured by another fastener (not shown in FIGS. 5-7).

Figure 8:
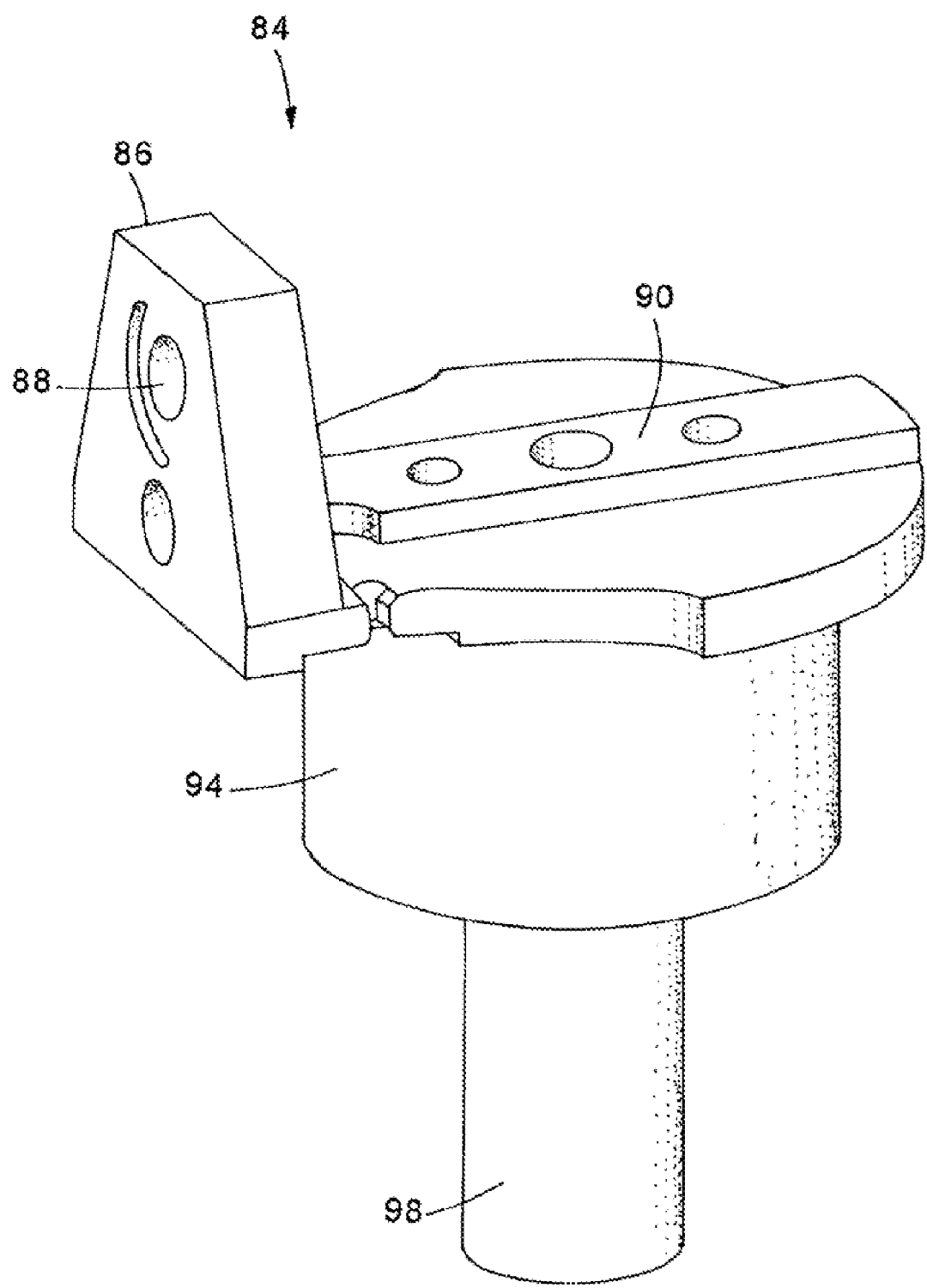
FIG. 8 is a voice coil holder constructed in accordance with embodiments of the present invention depicted in isolation.
Figure 9:
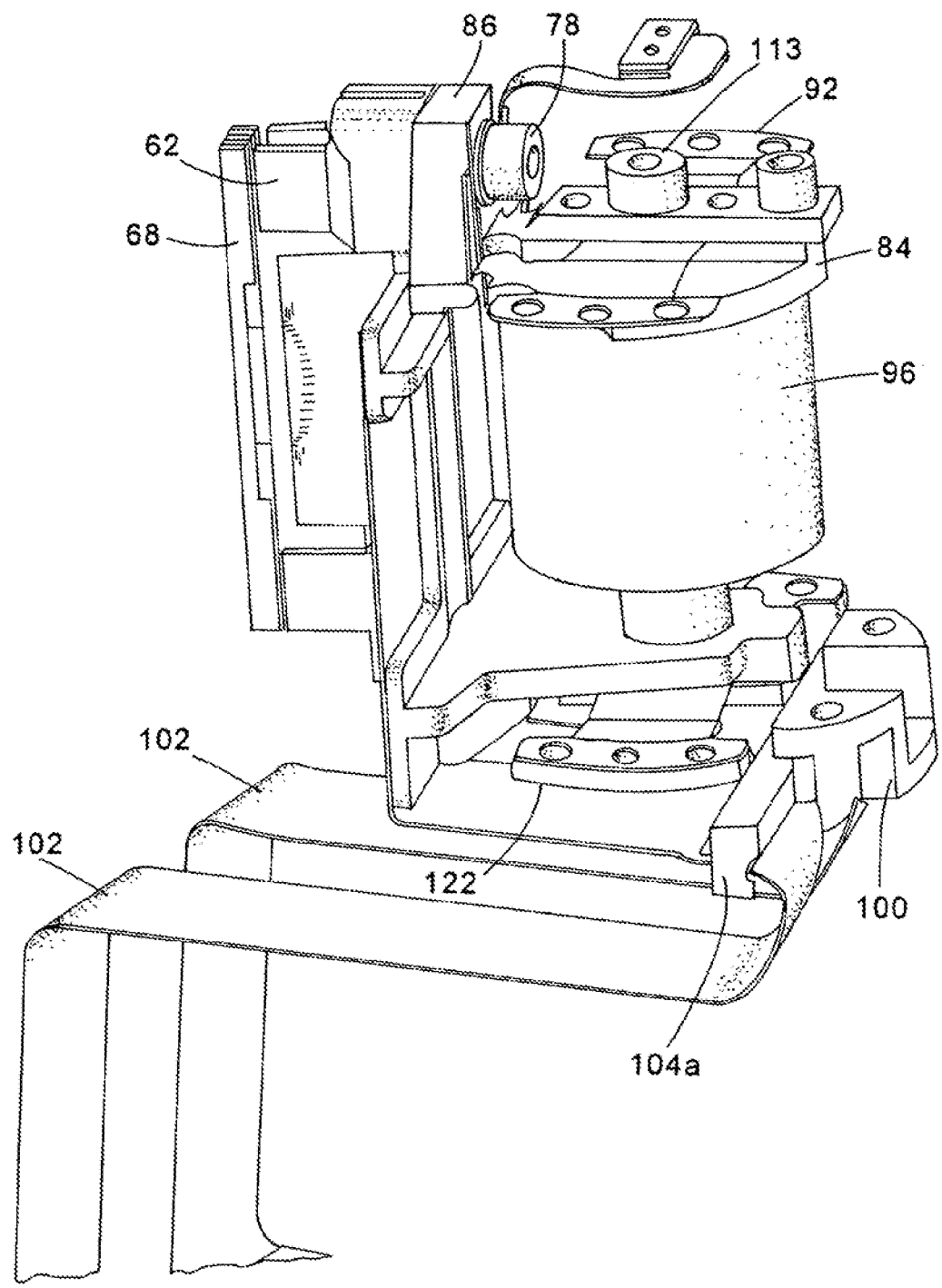
FIG. 9 depicts the head carriage assembly and voice coil and voice coil holder in an assembled state in accordance with embodiments of the present invention.

The voice coil holder assembly 64 includes a voice coil holder 84 (seen in isolation in FIG. 8) and a voice coil 96 seen in FIG. 9. The voice coil holder may be of a stiffer material, such as aluminum to provide structural rigidity that is many times stronger than the plastic material employed in the head carriage assembly 62. At the same time, the separate nature of the head carriage assembly 62 and the voice coil holder assembly 64 provides for easy manufacture.

The voice coil holder 84 includes an attachment section 86 with a hole 88 to attach the voice coil holder 84 to the head carriage assembly 62 at the threaded hole 76. The voice coil holder 84 includes a top flexure mounting surface 90 to which a top flexure 92 (see FIG. 9) is attached.

A voice coil mounting cylinder 94 of the voice coil holder 84 fits within the voice coil motor, as will be described later. The voice coil 96 is mounted to the cylinder 94. A threaded hole 98 is provided at the bottom of the voice coil holder 84 and provides a means for attaching the voice coil holder 84 to the head carriage assembly 62 at the horizontal support member 80 through the screw hole 82 (see FIG. 7).

A head flexible printed circuit (FPC) bracket 100 is shown in FIG. 9 and routes the head FPCs 102 through head FPC locating features 104a, 104b as will be described in more detail later.

Figure 10:
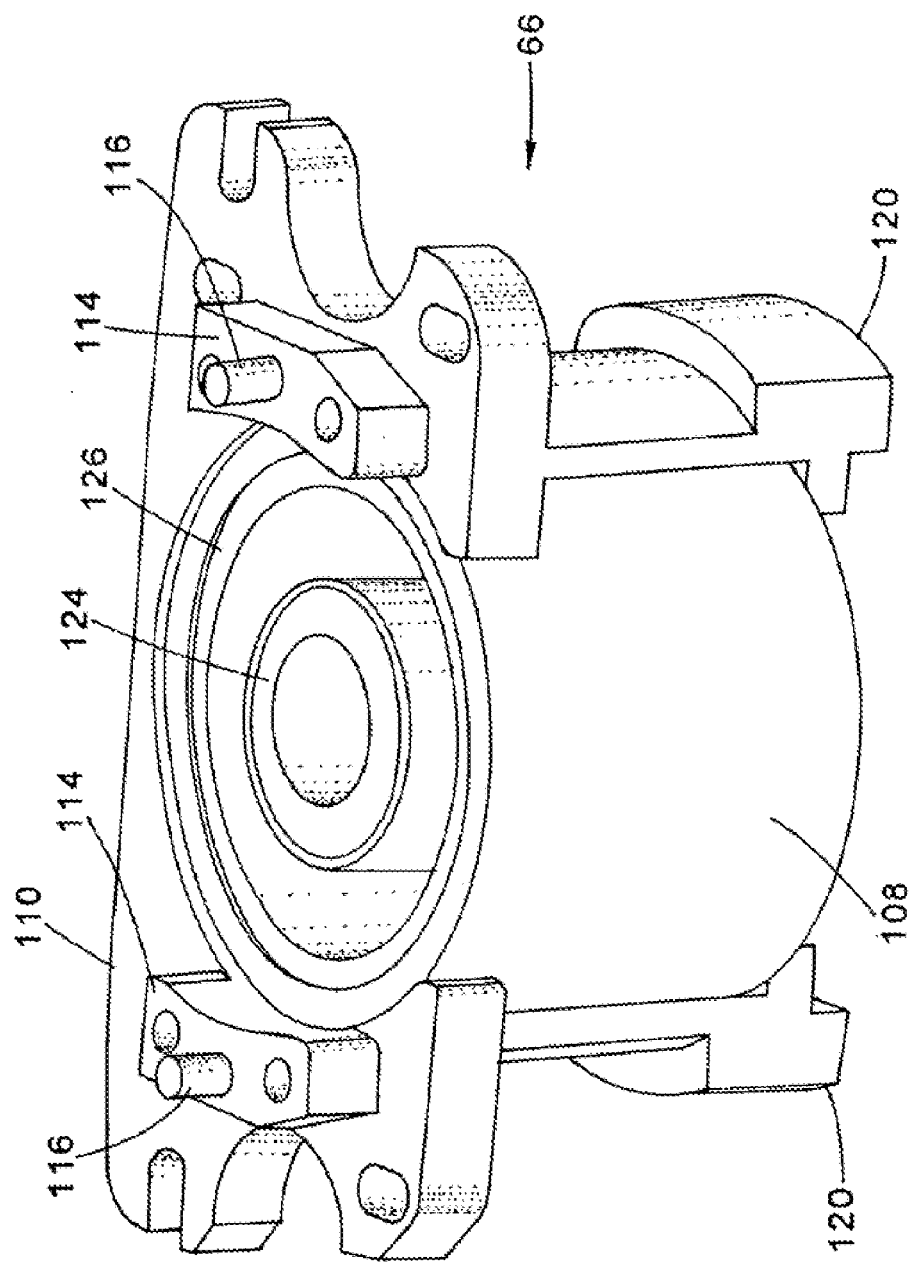
FIG. 10 is a top perspective view of a voice coil motor and voice coil motor holder constructed in accordance with embodiments of the present invention.

FIG. 10 is a perspective view of the voice coil motor holder assembly 66 in isolation. The voice coil motor 108 is securely held within a voice coil motor holder 110 of the voice coil motor holder assembly 66. Referring to FIGS. 7-10 and 12, voice coil holder assembly 64 is assembled into the voice coil motor holder assembly 66 in order to place the voice coil 96 into the magnetic gap of the voice coil motor 108. The top flexure 92 is assembled first at its center portion using the screw 113 and then at its outer portion such that it is secured to the mounting surfaces 114 of the assembly 66. Head-carriage assembly 62 is assembled to the voice coil holder assembly 64, using the screw 78 such that the holes 88 and 76 are aligned. Bottom flexure 122 is assembled at its outer portions at the surfaces 120 of assembly 66. The center portion of bottom flexure 122 and the support 82 of the head-carriage assembly 62 are secured to the voice coil holder assembly 64, using the screw 112 by fastening it into the threaded hole 98.

The voice coil motor holder 110 has a pair of top flexure mounting surfaces 114 on which the top flexure 92 is mounted. Locating posts 116 help to locate the top flexure 92 during assembly and fasteners 118 (see FIG. 6) secure the top flexure 92 to the top flexure mounting surfaces 114.

Bottom flexure mounting surfaces 120 provide a surface for mounting the bottom flexure 122 (see FIG. 9) by fasteners that are not shown.

The voice coil motor 108 has a substantially cylindrical design but includes a novel tapered center pole 124. The tapering of the center pole 124 of the voice coil motor 108 provides room for the voice coil mounting cylinder 94 to easily fit between the center pole 124 and the magnet 126 of the motor 108.

Figure 11:
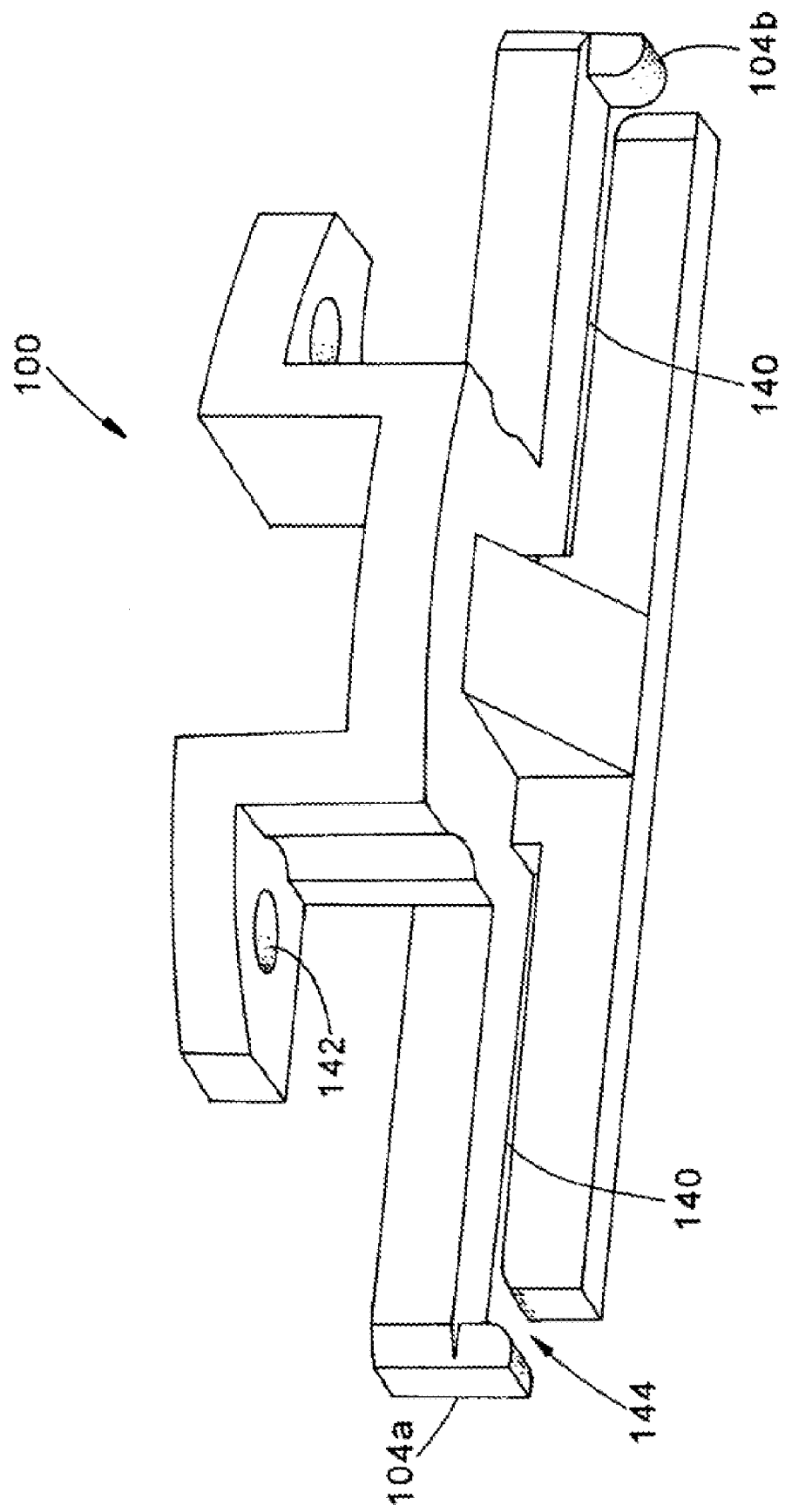
FIG. 11 is a bottom perspective view of a flexible printed circuit bracket in isolation, constructed in accordance with embodiments of the present invention.

The voice coil motor holder 110 also has fastener holes in the bottom flexure mounting surfaces 120 for attaching a FPC bracket 100 with head FPC locating features 104a, 104b as previously shown in FIG. 9. In conventional construction, the flexible printed circuit has tabs that needed to be precisely located and screwed in to locate and secure the head FPCs. However, the present invention provides an improved head FPC bracket 100, shown in isolation in FIG. 11, that obviates the need for screws on the head FPC. After attachment by the fasteners through bores 142 of the head FPC to the voice coil motor holder 110, the head FPCs 102 may be slid through the opening 144 into the slots 140 of the head FPC bracket 100. The head FPCs 102 are securely held in place and prevented from moving by the head FPC locating features 104a, 104b. When the head positioner assembly 10 is moved, the head FPC bracket 100 securely holds the head FPCs 102 and protects them from unwanted contact with other parts of the tape drive.

Figure 12:
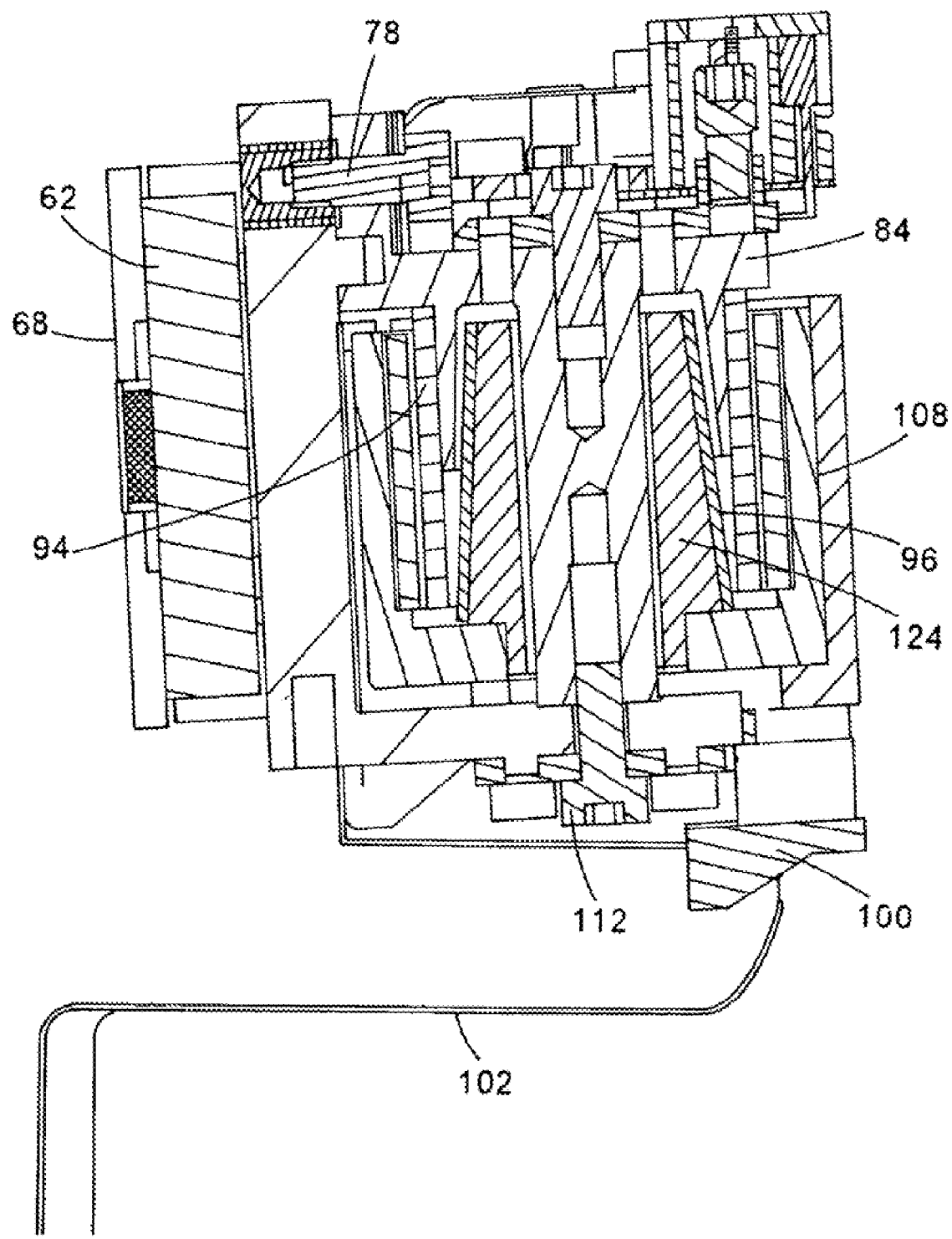
FIG. 12 is a cross-section of the fine positioner assembly constructed in accordance with embodiments of the present invention.

FIG. 12 depicts the fine positioner assembly 60 in cross-section. The tapering of the center pole 124 is clearly illustrated in this Figure, as well as the routing of the head FPCs 102 through the head FPC bracket 100. Also, the fastening of the voice coil holder 84 to the head carriage of the head carriage assembly 62 may be better understood from this Figure.

The present invention thus provides an arrangement that improves accuracy of the fine positioning of the head by improving on conventional system arrangements that involve translation of a rotational motion into a linear motion of a head traverse. Further, the invention provides an increased structural rigidity of the coarse positioner and avoids resonance related problems of conventional coarse positioner constructions. The invention also provides for efficient assembly by employing an improved flexible printed circuit routing system that reduces the cost of parts and eases the manufacturing assembly of the flexible printed circuit in the system. Further, the separation of the head-carriage and voice coil holder systems allows the use of different materials for the two systems, preventing any structural problems relating to single-structured head-carriage and coil-holder systems.

Also, the invention provides the advantage of providing a separated head and voice coil. Thus, if for any reason the voice coil is defective after assembly, the entire head assembly does not have to be discarded. Rather, a relatively inexpensive voice coil may be exchanged.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A head actuator assembly for a tape drive, comprising:
   a coarse positioner base assembly;
   first and second shafts vertically mounted at first ends on the coarse positioner assembly;
   a third threaded shaft extending vertically from the coarse positioner assembly;
   a motor assembly coupled to, and configured to rotate, the third threaded shaft; and
   a coarse positioner base configured to carry a head carriage assembly and voice coil holder, the coarse positioner base having at least first and second bores and at least first and second bushings respectively in the first and second bores, the coarse positioner base being vertically and linearly slidably mounted on the first and second shafts such that the first and second shafts respectively extend through the first and second bushings and the first and second bores, the first and second shafts having substantially smooth surfaces where the first and second shafts contact the first and second bushings respectively, the coarse positioner base further including a threaded bore through which the third threaded shaft extends and engages the threaded bore to cause the coarse positioner base to move vertically along the first and second shafts as the third threaded shaft rotates.

2. The head actuator assembly of claim 1, further comprising a biasing element coupled to bias the coarse positioner base against the second shaft.

3. The head actuator assembly of claim 2, further comprising a head carriage assembly and a separate voice coil holder removably connected to the head carriage assembly by a fastener.

4. The head actuator assembly of claim 3, wherein the head carriage assembly is made of plastic and the voice coil holder is made of metal.

5. The head actuator assembly of claim 4, further comprising a voice coil motor having a tapered center pole and a cylindrical outer magnet, with a space between the tapered center pole and the cylindrical outer magnet accommodating the voice coil holder.

6. The head actuator assembly of claim 5, further comprising a flexible printed circuit (FPC) bracket and a voice coil motor holder attached to the voice coil holder and holding the voice coil motor, the FPC bracket coupled to the voice coil motor holder and containing slots through which an FPC is routed and retained, the FPC bracket moving vertically with the voice coil motor as the coarse positioner base is vertically moved and carrying the FPC without interference.

7. The head actuator assembly of claim 1, further comprising a shaft support arrangement for supporting the second shaft, the shaft support arrangement comprising: first and second support shafts vertically mounted at a first end on the coarse positioner base assembly parallel to the second shaft; and a horizontal connecting plate mounted at a second end of the first and second support shafts and the second shaft.

8. The head actuator assembly of claim 1, wherein the first shaft is a guide shaft and the second shaft is an anti-rotation shaft.

9. A head actuator assembly for a tape drive, comprising:
   a head carriage assembly;
   a voice coil holder removably coupled to the head carriage assembly;
   a coarse positioner base assembly;
   two shafts mounted on the coarse positioner base assembly; and
   a coarse positioner base linearly slidably mounted on the two shafts with a force bias applied on the coarse positioner base against one of the two shafts;
   a flexible printed circuit (FPC) bracket; and
   a voice coil motor holder attached to the voice coil holder and holding a voice coil motor, the FPC bracket coupled to the voice coil motor holder and containing slots through which an FPC is routed and retained, the FPC bracket moving vertically with the voice coil motor as the coarse positioner base is vertically moved and carrying the FPC without interference.

* * * * *